United States Patent
Ayran

(10) Patent No.: US 7,347,246 B2
(45) Date of Patent: Mar. 25, 2008

(54) SIDE WINDOW SHADE WITH CONTOUR PART

(75) Inventor: Ekrem Ayran, Nurenberg (DE)

(73) Assignee: BOS GmbH & Co. KG, Ostfildern (DE)

( * ) Notice: Subject to any disclaimer, the term of this patent is extended or adjusted under 35 U.S.C. 154(b) by 268 days.

(21) Appl. No.: 10/993,327

(22) Filed: Nov. 19, 2004

(65) Prior Publication Data

US 2005/0126724 A1   Jun. 16, 2005

(30) Foreign Application Priority Data

Nov. 19, 2003   (DE) .................. 103 54 233

(51) Int. Cl.
*B60J 3/00* (2006.01)
(52) U.S. Cl. ................................. 160/370.22
(58) Field of Classification Search .......... 160/370.22, 160/265, 264; 296/97.4, 97.11
See application file for complete search history.

(56) References Cited

U.S. PATENT DOCUMENTS

| | | | | |
|---|---|---|---|---|
| 2,937,700 | A * | 5/1960 | Gibbons | ............... 160/354 |
| 4,974,658 | A * | 12/1990 | Komatsu et al. | ............ 160/310 |
| 5,076,633 | A * | 12/1991 | Hsu et al. | .................. 296/97.4 |
| 5,860,466 | A * | 1/1999 | Kao | ....................... 160/370.22 |
| 6,347,825 | B2 * | 2/2002 | Seel et al. | ................. 296/97.8 |
| 6,367,536 | B1 * | 4/2002 | St Louis | ...................... 160/90 |
| 6,910,518 | B2 * | 6/2005 | Zimmermann et al. | 160/370.22 |

FOREIGN PATENT DOCUMENTS

| | | |
|---|---|---|
| DE | 3822378 A1 | 1/1990 |
| DE | 29901928 U1 | 7/1999 |
| DE | 10215322 A1 | 10/2003 |
| DE | 10215331 A1 | 10/2003 |
| EP | 1129871 B1 | 9/2001 |
| EP | 1306251 A1 | 5/2003 |

* cited by examiner

*Primary Examiner*—Brian E. Glessner
*Assistant Examiner*—Candace L. Bradford
(74) *Attorney, Agent, or Firm*—Leydig, Voit & Mayer, Ltd.

(57) ABSTRACT

A side window shade for triangular windows contains a strip-shaped shade that is provided with a contour part on its pointed end. The contour part is arranged on a slide in a pivoted fashion and is able to align itself in accordance with the winding shaft when the shade is retracted. In the extracted position, the contour part is forced into a position in which it is pivoted away from the winding shaft by a certain distance in order to cover the window opening as completely as possible.

22 Claims, 3 Drawing Sheets

SIDE WINDOW SHADE WITH CONTOUR PART

FIELD OF INVENTION

This invention pertains to window shades for motor vehicles.

BACKGROUND OF INVENTION

In four-door motor vehicles, for example, sedans and station wagons, the side windows in the rear doors are usually have a divided configuration. The side window consists of a generally rectangular section and an approximately triangular section that is arranged rearward of and adjacent to the rectangular section. The two sections are separated by a guide column with which the moveable window pane is guided.

The triangular section has a substantial curvature relative to the separating guide column. The lower edge of the triangular section initially extends away from the separating guide column in a somewhat straight fashion and then with a more or less significant incline near the pointed rear end of the window section.

Although it is relatively easy to design a window shade for the rectangular section, it is quite difficult to produce a window shade for the triangular section if an adequate shading of the triangular section is also required.

Rear side windows that are pointed in a similar fashion can also be found on two-door sedans. However, the windows on such sedans are usually not divided into two sections.

EP 1 129 871 discloses a side window shade that is suitable for the rear portion of a side door window. This strip-shaped window shade includes a winding shaft that is arranged in the area of the separating guide column and is prestressed in the wind-up direction of the shade by a spring drive.

The front edge of the strip-shaped shade contains an eyelet to which an actuating lever is hinged. The actuating lever is guided in a restricted manner underneath the window edge in two guideways. In the retracted position, the actuating lever lies approximately parallel to the winding shaft and the guide rail that separates the window unit. While in the other position, the actuating lever is pivoted in the direction of the point of the triangular window section. In this position, the lever lies transversely in front of the strip-shaped shade and, consequently, is visible.

OBJECTS AND BRIEF SUMMARY OF INVENTION

In view of the foregoing, an object of the invention is to develop a side window shade for motor vehicles in which the actuating mechanism is less conspicuous.

In the side window shade of the invention, the winding shaft is situated opposite the extensively curved edge portion of the side window. The contour of the strip-shaped shade wound onto the winding shaft corresponds to the contour of the window.

One edge of the strip-shaped shade is fixed on the winding shaft, while the distal edge of the strip-shaped shade relative to the winding shaft is provided with a contour part. This contour part is configured in such a way that it adapts itself to the extensively curved edge section and adjoins this edge section in a mainly tight fashion when the strip-shaped shade is extracted. A hinge serves to hinge the contour part to a slide, which is guided in a guide-rail arrangement underneath the window within the vehicle, for example, within the door.

The hinge allows the contour part to adequately adjoin the winding shaft when the strip-shaped shade is retracted so as to achieve the least possible projection of the contour part. When the strip-shaped shade is extracted, the contour part can be advanced into the extensively curved edge portion of the side window while simultaneously subjecting the strip-shaped shade to tension over its entire surface. A flat contour part is sufficient for this purpose.

In the side window shade of the invention, the contour part simultaneously forms part of the actuating or drive unit and part of the strip-shaped shade in order to cover the window over a large surface. This arrangement eliminates the clearly visible lever that is required in the prior art and extends in front of the strip-shaped shade. The contour part advantageously replaces the actuating lever.

A particularly simple design of the side window shade of the invention is achieved if only a single hinge is provided for connecting the contour part to the slide.

A particularly space-saving and aesthetic arrangement is achieved if the contour part has an oblong shape and is limited, for example, by two edges that are curved in the shape of an arc and converge from the slide.

In order to achieve the desired pivoting movement of the contour part, the contour part may be provided with a driver that lies on the opposite side of the contour part relative to the hinge axis.

This driver may cooperate with a limit stop that is arranged at the end of the extraction path of the side window shade.

Manufacturing tolerances on the door can be compensated if the limit stop is realized in an elastically deformable fashion.

The side window shade of the invention is particularly suitable for side windows that have a straight lower edge. Such windows can be found on motor vehicle windows that are divided into two sections by means of a separating column, with one window section having an essentially rectangular shape and the other window section having an at least approximately triangular shape.

The winding shaft can be accommodated in a space-saving fashion if it is aligned vertically. For example, the winding shaft may be arranged in the separating column.

The guide arrangement for the slide can be largely accommodated underneath the window parapet if the strip-shaped shade has a straight edge.

It is possible to merely guide the strip-shaped shade on one side if the strip-shaped shade is reinforced with rods that extend parallel to the axis of the winding shaft. This prevents the portions of the strip-shaped shade that extend above the contour section and have an arc-shaped edge from sagging inward into the vehicle due to the practically non-existent tension at this location.

A very simple actuation can be achieved if an actuating element that is connected to the slide moves within the guide rail. For example, the actuating element may consist of a flexible thrust element that is guided within the guide rail in a buckle-proof fashion. However, it is also possible to utilize traction cables to produce the movement of the strip-shaped shade. Instead of utilizing an actuating element that cooperates with the slide, it is also possible for an actuating element to engage the contour part in order to produce the desired pivoting movement.

The drive unit of the side window of the invention shade may comprise an electric motor and a spring. The spring may be in the form of a spring drive and can cooperate with the winding shaft, while the electric motor engages on the contour part, and the slide, respectively.

DETAILED DESCRIPTION OF THE INVENTION

Figure 1:
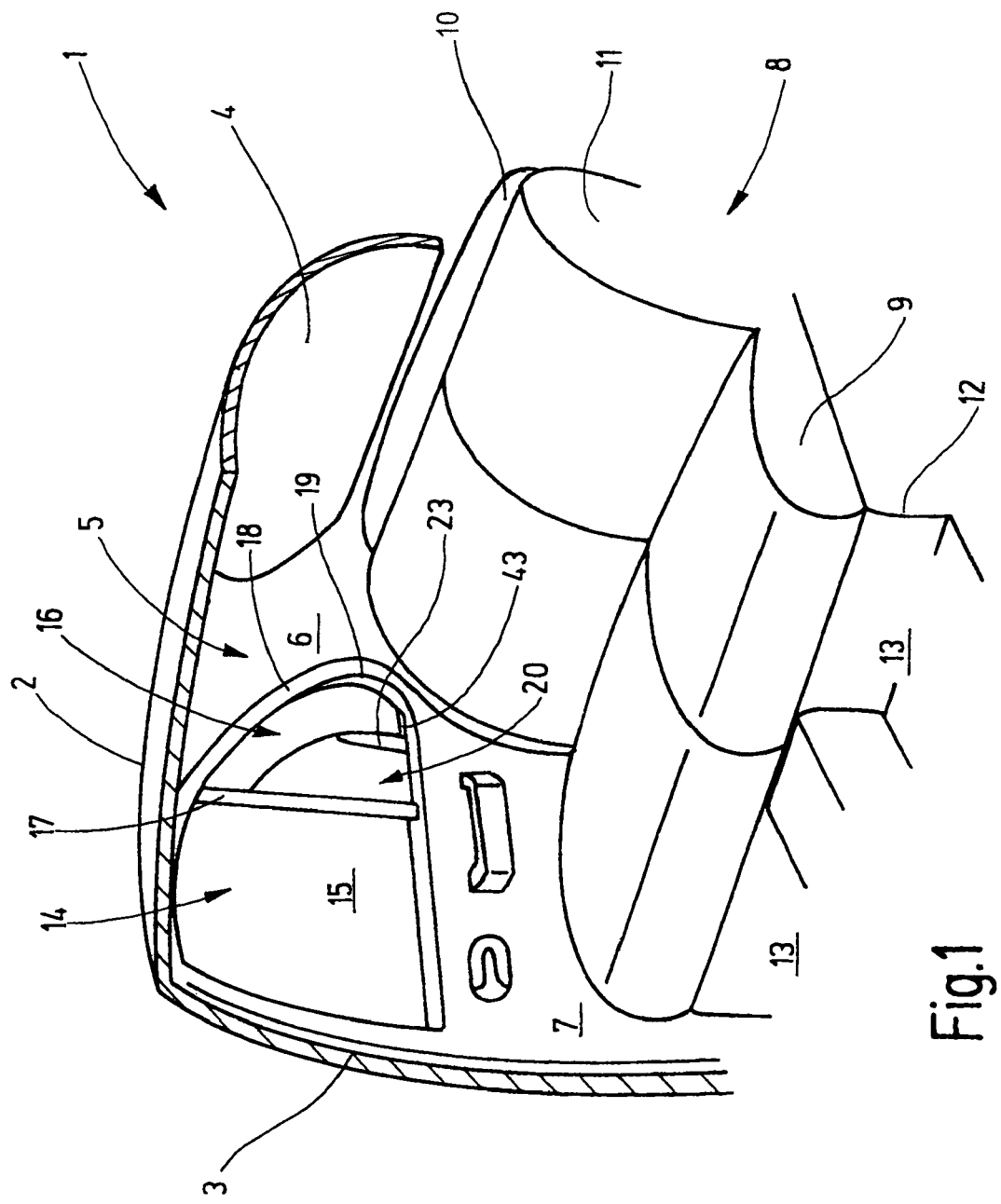
FIG. 1 is a perspective section view of the rear passenger compartment of an exemplary motor vehicle showing the inside of the right rear door.

FIG. 1 illustrates a partially cutaway rear passenger compartment of a motor vehicle. FIG. 1, in particular, shows the right inner side of the passenger compartment which is a mirror image of the not-shown left inner side. FIG. 1 provides a schematic representation in which interior structures of the car body such as reinforcement members and mounting arrangements are not illustrated, because they are not required for understanding the invention.

The illustrated car body section 1 includes a roof 2, from which a B-column 3 laterally extends downward to a floor group (not shown). A corresponding B-column naturally is also arranged on the not-shown side of the motor vehicle. The roof 2 transitions into a rear window 4 on its rear edge. The rear window 4 laterally ends on a C-column 5 that is spaced apart from the B-column 3. The C-column carries the inside lining 6. Between the B-column and the C-column, a right rear door is conventionally hinged to the B-column. A rear bench 8 consisting of a seat 9 and a backrest 11 is arranged at the height of the right rear door. The rear seat 9 lies on a base surface 12 that forms part of the floor group in front of which a certain amount of leg room 13 is created. A rear window shelf 10 extends to the lower edge of the rear window 4 at the height of the upper edge of the backrest 11.

The right rear door 7 of the sedan is conventionally provided with a side window 14. The side window 14 is divided into a first window section 15 and a second, rear window section 16. The first window section 15 has an essentially rectangular shape and is rearwardly bordered by a guide column 17 that simultaneously represents one edge of the second window section 16. The second window section 16 is bordered by a door frame 18 on the opposite side of the guide column 17, with the door frame defining the shape of the second window section 16 together with the guide column 17. In the illustrated embodiment, the second window section has an approximately triangular shape, wherein the edge identified by the reference symbol 19 has a significant curvature. This curved edge lies opposite the guide column 17.

Figure 2:
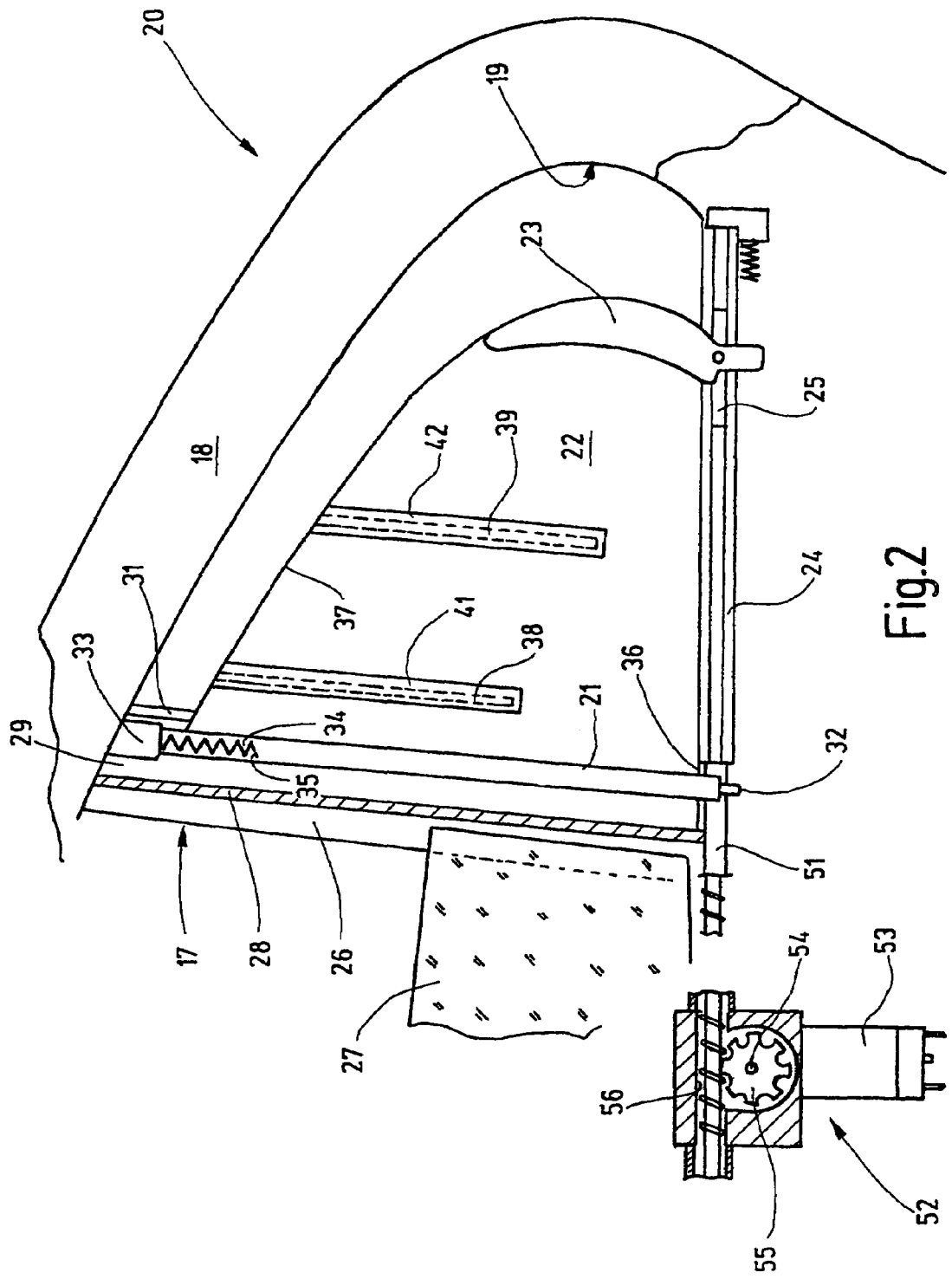
FIG. 2 is a schematic section view of the motor vehicle door of FIG. 1 showing an illustrative side window shade according to the invention.

A side window shade 20 is assigned to the second window section 16. The basic design of the side window shade 20 is illustrated in FIG. 2. The side window shade 20 essentially comprises the above-mentioned guide column 17, a winding shaft 21, a strip-shaped shade 22, a contour part 23, a guide rail 24 and a slide 25.

On its side facing the first window section 15, the guide column 17 carries two guide strips 26 that extend parallel to each other and delimit a U-shaped groove between them. Only one of the guide strips 26 is visible FIG. 2. The vertically moveable window pane 27 moves within the groove formed between the two guide strips.

The guide column 17 simultaneously forms a housing. Accordingly, a back 28, at which the guide strips 26 originate, also represents the rear wall of the housing, of which only one side wall 29 is in FIG. 2. The other side wall is not visible FIG. 2. The two side walls 29 end in a slot, the edges of which are identified by the reference symbol 31. The winding shaft 21 is rotatably supported within the housing thus formed, i.e., within the guide column 17. The axis of the winding shaft 21 extends parallel to the guide column 17 and, consequently, about vertically. On its lower end, the winding shaft is rotatably supported in a bearing (not shown) with the aid of a bearing journal 32. An upper bearing 33 is arranged on the door frame 18.

Part of a drive unit in the form of a spring drive 34 (schematically shown) is situated within the tubular winding shaft 21. The spring drive is anchored in a rotationally rigid manner to the door frame 18 at one end and to the winding shaft 21 at the other end (at 35). The spring drive 34 prestresses the winding shaft 21 in the wind-up direction of the strip-shaped shade 22. The strip-shaped shade 22 has a shape that approximately corresponds to the opening defined by the door frame 18 and the guide column 17. This means that the strip-shaped shade 22 bordered by a lower edge 36 that extends parallel to the lower window soffit and an edge 37 that extends obliquely thereto and follows the contour of the door frame 18. The contour part 23 is situated at the location at which the two edges 37 and 36 transition into one another.

The strip-shaped shade 22 is reinforced with thin rods 38 and 39 in order to prevent sagging. In the wound-up state, these rods extend parallel to the axis of the winding shaft 21 and lie in tubular pockets. The tubular pockets are formed by bonding onto the strip-shaped shade 22 narrow strips 41 and 42 mode of a material with a low resistance to bending.

The guide rail 24 extends over the entire length of the straight section of the lower edge of the second window section 16, namely underneath the window soffit such that the guide rail 24 is not visible from outside. In this case, only the strip-shaped shade 22 and the contour part 23 protrude upward through a window shade slot 43 (see FIG. 1).

Figure 3:
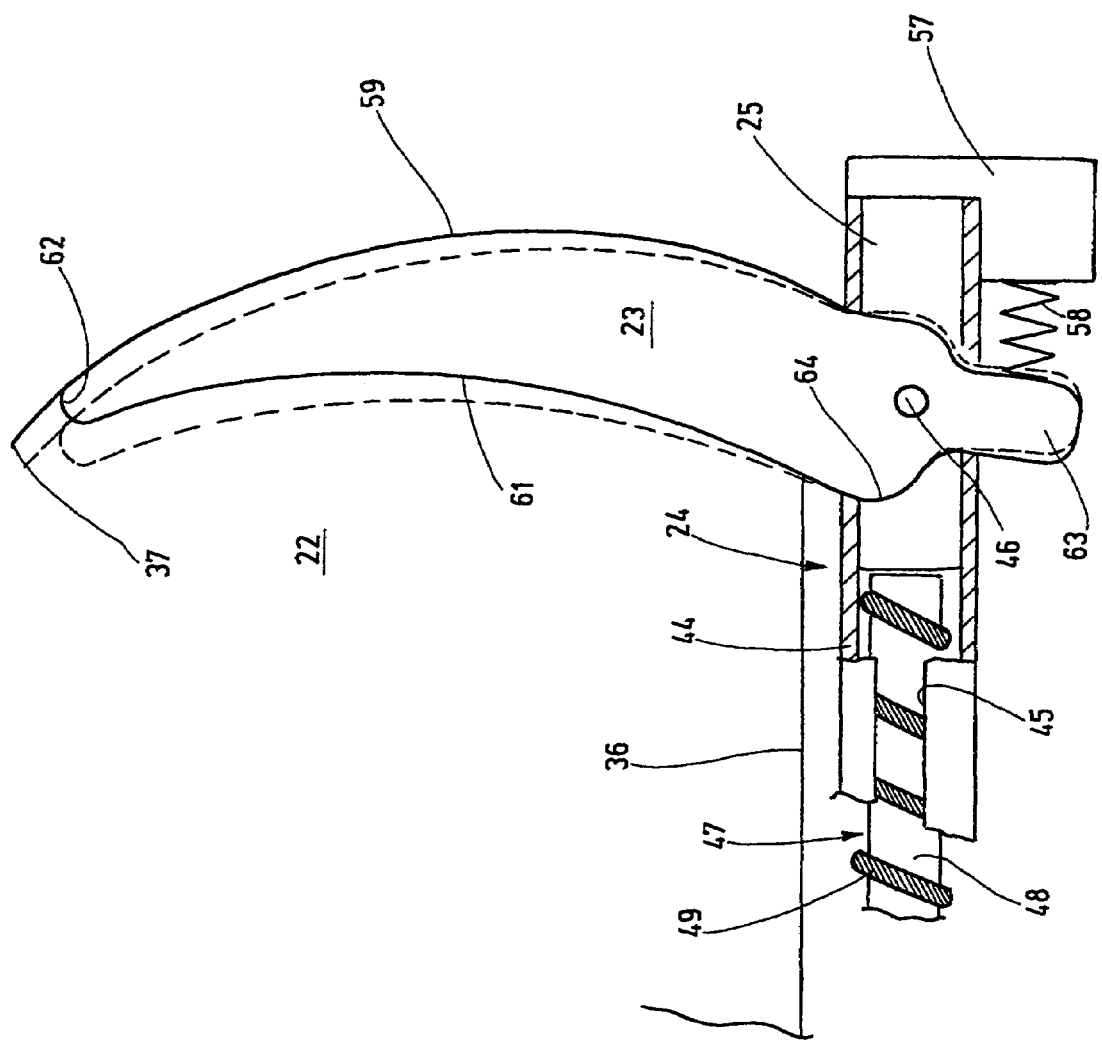
FIG. 3 is a schematic side view of the contour part of the side window shade of FIG. 2 showing the pivoting movement.

The guide rail contains a guide groove that is composed of a groove chamber 44 and a groove slot 45 that makes the groove chamber 44 accessible from outside. The groove slot 45 points into the vehicle interior. The groove chamber 44 has a square cross section, with the side length of the square being greater than the width of the groove slot 45 such that an undercut guide groove is formed. The slide 25 in the form of a sliding block moves in the groove chamber 44, with the cross section of the sliding block being adapted to the cross section of the groove chamber 44. The dimensions of the sliding block are chosen such that the slide 25 is able to slide in the groove chamber 44 without jamming. The contour part 23 is hinged to the sliding block 25 by means of a hinge, the hinge axis 46 of which is indicated in FIG. 3. The hinge axis 46 protrudes outward from the sliding block 25 through the groove slot 45 and carries the contour part 23 at this location. The hinge 46 enables the contour part 23 to carry out a pivoting movement in the plane of the second window section 16, namely about an axis that extends about perpendicular to the plane defined by the second window section 16.

The movement of the sliding block 25 is produced with the aid of an elongated thrust element 47 that is guided in a rigid manner and is composed of a cylindrical core 48 and a rib 49 that helically extends around the cylindrical core 48.

This results in a flexible toothed rack with a transverse gearing. The outside diameter of the thrust element including the rib corresponds to the clear width of the groove chamber 44 such that buckle-proof guidance is ensured.

According to FIG. 2, a guide tube 51 leading to a geared motor 52 is situated adjacent to the guide rail 24. The geared motor 52 comprises a permanently excited d.c. motor 53 with an output shaft 54 on which a cylindrical gear 55 is seated fixed against rotation. The pitch of the cylindrical gear 55 corresponds to the pitch of the helical rib 49. A bore 56 tangentially extends past the gear 55, with the elongated thrust element 47 being guided through said bore. Due to the position of the bore 56, the helical rib 49 is engaged with the gear 55.

The guide tube 51 is connected to the end of the guide rail 24 that lies adjacent to the guide column 17. As shown in FIG. 2, the length of the guide rail 24 is shorter than the distance between the guide column 17 and the summit of the significantly curved region 19. In order to also shade this section without creating a prominent projection over the slot 31 in the retracted state, a limit stop 57 for positively stopping the movement of the illustrated sliding block 25 is provided at the end of the guide rail 24. The limit stop 57 includes a pressure spring 58 underneath the guide rail 24.

As shown in the drawings, the contour part 23 is flat and has the shape of a saber or sword. The contour part consists of a relatively rigid material. The contour part 23 is bordered in the moving direction by an edge 59 that corresponds to the contour of the significantly curved region 19. An edge 61 of the contour part 23 that lies opposite the edge 59 also has a significant curvature, with both curvature radii lying on the same side of the contour part 23. Both edges 59 and 61 converge in the direction of a point 62 that lies distant relative to the hinge 46. On the opposite side relative to the hinge 46, the contour part 23 is provided with a lever 63. The lever 63 is designed for cooperating with the pressure spring 58.

This arrangement functions as described below:

The functional description is based on a central position such as shown in FIG. 2. In this position, the strip-shaped shade 22 is extracted a certain distance. The movement of the thrust element 47 is blocked by the geared motor 52, which is at a standstill. The spring drive 34 prestresses the winding shaft 21 in the wind-up direction of the strip-shaped shade 22. The strip-ship shade 22 pulls the contour part 23 together with the sliding block 25 against the corresponding blunt end of the thrust element 47 as shown in FIG. 3.

The hinge 46 serves for adjusting the contour part 23 into an intermediate position in which the upper edge 37 of the strip-shaped shade 22 is subjected to less tension than is the lower edge 36. If the geared motor 52 is set in motion in this operating position such that it retracts the elastically bendable thrust element 47 from the guide rail 24, the sliding block 25 is able to follow this movement. This causes the strip-shaped shade 22 to be wound onto the winding shaft 21. The end of the retraction movement is reached when the wind-up movement of the strip-shaped shade 22 is stopped due to the contact between the edges of the contour part that are situated closest to the winding shaft 21, for example, the point 62 and the bulge 64 that lies on the lower end of the edge 61 and the wound-up shade 22. In this position, the contour part 23 is pivoted in the direction of the winding shaft 21. Edge 59 of the contour part 23 protrudes as little as possible from the slot 34. This position is illustrated with broken lines in FIG. 3.

If the strip-shaped shade 22 needs to be extracted in front of the second window section 16 from this position, the geared motor 52 is set in motion in the opposite rotating direction. This causes the flexible thrust element 47 to be advanced within the guide rail 24. The thrust element 47 subjects the sliding block 25 to a corresponding movement. This causes the strip-shaped shade 22 to be unwound from the winding shaft against the force of the spring drive 34.

Since the force of the contour part 23 acts upon approximately the lower half of the strip-shaped shade 22, the upper part of the strip-shaped shade 22 is subjected to less tension and tends to sag. As soon as the end of the extraction movement is reached, the sliding block 25 comes in contact with the limit stop 57. However, the lever 63 has already come in contact with the pressure spring 58 a certain distance before this occurs. This causes the pressure spring 58 to pivot the contour part 23 about the hinge 46 in the clockwise direction by means of the force acting on the lever 63. This causes tension to also build up in the upper region of the strip-shaped shade 22, and the contour part 23 is aligned parallel to the significantly curved region 19 such that the edge 59 follows the contour of this curved region 19 very well over its entire length.

If the contour part 23 were immovably mounted on the sliding block 25, the edge 59 would project much further outward from the slot 31 in this position. The projection from the slot 31 and the final tension in the upper region of the fully extracted strip-shaped shade 22 are achieved with the aid of the movable contour part 23. The pressure spring 58 acts in a self-adjusting manner by limiting the force, by means of which the tension in the strip-shaped shade 22 is built up in an imaginary section above the contour part 23.

A side window shade for triangular windows contains a strip-shaped shade that is provided with a contour part on its pointed end. The contour part is pivotally supported on a slide and is able to align itself in accordance with the winding shaft when the shade is retracted. In the extracted position, the contour part is forced into a position in which it is pivoted away from the winding shaft by a certain distance in order to cover the window opening as completely as possible.

What is claimed is:

1. A side window shade for a motor vehicle having a side window with a substantially curved edge, the side window shade comprising:
   a rotatably supported winding shaft arranged opposite the curved edge;
   a strip-shaped shade having one edge fixed to the winding shaft;
   a contour part mounted on the strip-shaped shade, the contour part having an edge region which has a shape corresponding to the curved edge of the side window;
   a guide rail arranged adjacent to strip-shaped shade when the shade is in an extracted position;
   a slide connected to said strip-shaped shade and guided for movement by the guide rail between a retracted position of said shade in which the shade is wound around said winding shaft and an extended position pulled outwardly a distance from the windup shaft; and
   a hinge for connecting the contour part to the slide for pivotal movement about a hinge axis that extends perpendicular to a plane defined by the strip-shaped shade when in the extracted position such that said contoured part is moveable about said hinge axis in response to movement of said shade between said retracted and extended positions.

2. The side window shade according to claim 1, wherein the hinge is the only hinge connecting the contour part to the slide.

3. The side window shade according to claim 1, wherein the edge region of the contour part is a first edge region and the contour part is bordered by the first edge region and a second edge region, the first and second edge regions being curved in an arc-shaped fashion and converging away from the slide.

4. The side window shade according to claim 1, wherein the contour part has an oblong shape.

5. The side window shade according to claim 1, wherein the contour part has a lever on an opposite side of the contour part relative to the hinge axis.

6. The side window shade according to claim 5, wherein the lever cooperates with a limit stop that is arranged at an end of an extension path of flue shade.

7. The side window shade according to claim 6, wherein the limit stop is elastically deformable.

8. The side window shade according to claim 1, wherein the strip-shaped shade is configured for covering a side window having ti generally triangular shape.

9. The side window shade according to claim 1, wherein the strip-shaped shade is configured for covering a side window having a straight lower edge.

10. The side window shade according to claim 1, wherein the strip-shaped shade is configured for covering a side window that is a section of a rear motor vehicle door window.

11. The side window shade according to claim 1, wherein the winding shaft is arranged vertically.

12. The side window shade according to claim 1, wherein the winding shaft is adapted for mounting within a separating column of a motor vehicle.

13. The side window shade according to claim 1, wherein the shade has one straight edge.

14. The side window shade according to claim 1, wherein the shade is reinforced with rods that are aligned parallel to the axis of the winding shaft.

15. The side window shade according to claim 1, wherein an actuating element is connected to the slide and moves within the guide rail.

16. The side window shade according to claim 15, wherein the actuating element comprises a flexible thrust element that is guided in a buckle-proof fashion within the guide rail.

17. The side window shade according to claim 1, wherein an actuating element is connected to the contour part and moves within the guide rail.

18. The side window shade according to claim 1, further including a drive unit comprising an electric motor and a spring drive.

19. The side window shade according to claim 18, wherein the electric motor is coupled with the winding shaft.

20. The side window shade according to claim 18, wherein the electric motor is coupled with the slide.

21. The side window shade according to claim 18, wherein the electric motor is coupled with the contour part.

22. The side window shade of claim 1 in which said contour part is pivotable about said hinge axis adjacent the extended position of said shade for tensioning the shade in the extended position.

* * * * *